United States Patent
Oh et al.

(10) Patent No.: US 12,322,213 B2
(45) Date of Patent: Jun. 3, 2025

(54) TOTAL TERMINAL SYSTEM AND OPERATING METHOD THEREOF

(71) Applicants: Hyundai Motor Company, Seoul (KR); Kia Corporation, Seoul (KR)

(72) Inventors: Jeongtaek Oh, Seoul (KR); Sojeong Kim, Seoul (KR); Hanul Lee, Seoul (KR); Donghyuk Oh, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 348 days.

(21) Appl. No.: 17/697,453

(22) Filed: Mar. 17, 2022

(65) Prior Publication Data
US 2022/0415096 A1    Dec. 29, 2022

(30) Foreign Application Priority Data
Jun. 25, 2021  (KR) ................ 10-2021-0083236

(51) Int. Cl.
G07B 15/02    (2011.01)

(52) U.S. Cl.
CPC ................. *G07B 15/02* (2013.01)

(58) Field of Classification Search
CPC ........ G07B 15/02; G07B 13/02; G07B 13/00; G07B 13/04; G07B 13/10; G07B 15/063; G06Q 10/02; G06Q 10/047; G06Q 20/145; G06Q 30/0284; G06Q 50/40; G06F 9/453; G06F 3/04817; G06F 3/0482; G06F 3/04842
See application file for complete search history.

(56) References Cited

U.S. PATENT DOCUMENTS

| | | | |
|---|---|---|---|
| 9,916,071 B2 | 3/2018 | Penilla et al. | |
| 10,123,155 B2 | 11/2018 | Grover et al. | |
| 2015/0099495 A1* | 4/2015 | Crosbie | B60K 35/00 455/414.3 |

(Continued)

OTHER PUBLICATIONS

Sienrak. (Dec. 12, 2018). Exclusive: A sneak peek at the new Tablet Taxi Verifone is bringing to New York City. VentureBeat. https://venturebeat.com/mobile/verifone-tablet-taxi-square-new-york-cab/ (Year: 2018).*

*Primary Examiner* — Shannon S Campbell
*Assistant Examiner* — Manal A. Alsamiri
(74) *Attorney, Agent, or Firm* — SLATER MATSIL, LLP

(57) ABSTRACT

A total terminal system includes a front-seat total terminal provided in a front driver compartment of a taxi vehicle and a rear-seat total terminal provided in a rear passenger compartment of the taxi vehicle. The front-seat total terminal includes an application program device configured to execute a plurality of application programs and a data management device including a plurality of service data storage units configured to store data for providing a plurality of services, wherein a first application program among the plurality of application programs is configured to write first information to a corresponding first service data storage unit among the plurality of service data storage units and the first service data storage unit is configured to transmit the first information to a second application program that is connected to the first service data storage unit.

12 Claims, 9 Drawing Sheets

(56) References Cited

U.S. PATENT DOCUMENTS

| | | | |
|---|---|---|---|
| 2015/0178714 A1* | 6/2015 | Amtmann | G06Q 40/02 |
| | | | 705/41 |
| 2016/0125663 A1* | 5/2016 | Joo | G06Q 20/342 |
| | | | 705/13 |
| 2018/0024725 A1* | 1/2018 | Penilla | G06F 3/04842 |
| | | | 701/49 |
| 2018/0101877 A1* | 4/2018 | Song | G06Q 30/0206 |
| 2019/0228663 A1* | 7/2019 | Meyers | G08G 1/202 |
| 2019/0333063 A1* | 10/2019 | Lim | G06Q 20/4015 |
| 2020/0104965 A1* | 4/2020 | Ramot | G08G 1/202 |

* cited by examiner

TOTAL TERMINAL SYSTEM AND OPERATING METHOD THEREOF

CROSS-REFERENCE TO RELATED APPLICATIONS

This application claims the benefit of Korean Patent Application No. 10-2021-0083236, filed on Jun. 25, 2021, which application is hereby incorporated herein by reference.

TECHNICAL FIELD

The present disclosure relates to a total terminal system and an operation method of a total terminal system.

BACKGROUND

A taxi vehicle providing a taxi service is provided with a plurality of channels. For example, a call terminal for receiving and selecting a taxi call, a payment machine for charging a traveling charge, an audio, a video, a navigation aid, a taxi meter, etc. may be provided in the taxi vehicle. While traveling, a case that the taxi driver may have to operate a plurality of channels may occur. This may distract the taxi driver attention and cause a traffic accident.

If the user has a request while moving through the taxi vehicle, the user directly orally transmits the request to the taxi driver. Depending on the traveling environment of the taxi vehicle, the conversation between the user and the taxi driver may not be smooth. In this case, the taxi driver takes an action to understand the request from the user. This causes the taxi driver's attention to be distracted. In addition, the user suffers from the inconvenience of having to repeatedly explain the request.

SUMMARY

Embodiments of the present disclosure provide a total terminal system and an operation method of a total terminal system that may provide an optimal service to users without distracting taxi drivers while traveling in a taxi.

A total terminal system of embodiments of the present invention includes a front-seat total terminal provided in a front seat of a taxi vehicle for a driver of the taxi vehicle and a rear-seat total terminal provided in a rear seat of the taxi vehicle for a user who boarded the taxi vehicle. The front-seat total terminal includes an application program device including a plurality of application programs necessary for the operation of the taxi vehicle and a data management device including a plurality of service data storage units for storing data necessary to provide a plurality of services related to the operation of the taxi vehicle. A first application program among a plurality of application programs writes first information to a corresponding first service data storage unit among a plurality of service data storage units, and the first information is transmitted to a second application program connected to the first service data storage unit among a plurality of application programs.

The first application program may calculate a travel charge by measuring a moving distance of the taxi vehicle when the travel button is selected, and write the travel charge to the first service data storage unit related to a travel charge payment among the plurality of service data storage units, and each of the front-seat total terminal and the rear-seat total terminal may display the travel charge on a screen.

The first application program may receive an additional charge by the driver and write it to the first service data storage unit.

The first application program may receive information on city, intercity, and surcharge, and calculate a travel charge based on the input information.

The second application program may receive the high-pass fee from the high-pass terminal, and write information about the toll fee in the first service data storage unit.

The first application program may receive information about the additional charge by the driver and write it to the first service data storage unit.

The first application program, when the payment selection is input by the driver, may write the payment to the first service data storage unit, and the first service data storage unit may transmit information on the travel charge, information on the toll fee, and information on the additional charge to a payment machine and the rear-seat total terminal.

The second application program may receive information about a call request from a call/dispatcher server that manages a call/dispatcher, and write information about the received call request to a second service data storage unit storing a service data related to the call/dispatcher among a plurality of service data storage units.

The first application program may write the business status of the taxi vehicle to the second service data storage unit, and the business status may include Traveling and Empty.

If the first application program writes the business status as Empty to the second service data storage unit, information indicating an empty car may be transmitted to the second application program, and the second application program may be switched to a call waiting state.

A third application program among a plurality of application programs may receive information about the destination from the second service data storage unit, derive a plurality of movement paths from the current position of the taxi vehicle to the destination, estimate an arrival time for each of a plurality of derived movement paths, and transmit the destination, the selected one of the plurality of derived movement paths, and an estimated arrival time based on the selected movement path to the rear-seat total terminal.

The second application program may derive a plurality of movement paths based on the destination of the user boarding the taxi vehicle, estimate an arrival time for each of the plurality of derived movement paths, and transmit the destination, the selected movement path among the plurality of derived movement paths, and the estimated arrival time based on the selected movement path to the rear-seat total terminal.

The rear-seat total terminal may calculate the remaining time required for the taxi vehicle to arrive at the destination along the selected movement path, and indicate that the taxi vehicle is near the destination if the remaining time is a predetermined reference time.

The front-seat total terminal, when a call request is received from the server managing the call/dispatcher, may accept or reject the call request by using a call approval button and a call rejection button provided in the taxi vehicle.

An operation method of a total terminal system including a front-seat total terminal provided in a front seat of a taxi vehicle for a driver of the taxi vehicle, and a rear-seat total terminal provided in a rear seat of the taxi vehicle for an user who boarded the taxi vehicle, includes writing first information to a corresponding first service data storage unit among a plurality of service data storage units of the front-seat total terminal by a first application program among a plurality of application programs of the front-seat total terminal and transmitting the first information to a second application program connected to the first service data storage unit among a plurality of application programs.

The operation method of the total terminal system may further include calculating the travel charge by measuring the moving distance of the taxi vehicle by the first application program, if a traveling button is selected, writing the travel charge into a first service data storage unit related to a payment of the travel charge among a plurality of service data storage units, and displaying the travel charge by each of the front-seat total terminal and the rear-seat total terminal.

The operation method of the total terminal system may further include receiving an additional charge by the driver and writing it to the first service data storage unit through the first application program.

The operation method of the total terminal system may further include receiving a high-pass fee from the high-pass terminal and writing information for a toll fee to the first service data storage unit through the second application program.

The operation method of the total terminal system may further include receiving information about the call request from the call/dispatcher server that manages a call/dispatcher through the second application program and writing it in a second service data storage unit that stores service data related to call/distribution of a plurality of service data storage units.

The operation method of the total terminal system may further include, through a third application program among a plurality of application programs, receiving information about the destination from the second service data storage unit, deriving a plurality of movement paths from the current position of the taxi vehicle to the destination, estimating an arrival time for each of the plurality of derived movement paths, and transmitting the destination, the selected movement path among the derived plurality of movement paths, and the estimated arrival time based on the selected movement path to the rear-seat total terminal.

The operation method of the total terminal system may further include, through the front-seat total terminal, when a call request is received from a server that manages a call/dispatcher, accepting or rejecting the call request using the call approval button and call rejection button provided in the taxi vehicle.

Embodiments of the present invention may provide the total terminal system and the operation method of the total terminal system that may provide an optimal service to users without distracting the taxi driver during the taxi driving.

DETAILED DESCRIPTION OF ILLUSTRATIVE EMBODIMENTS

Figure 1:
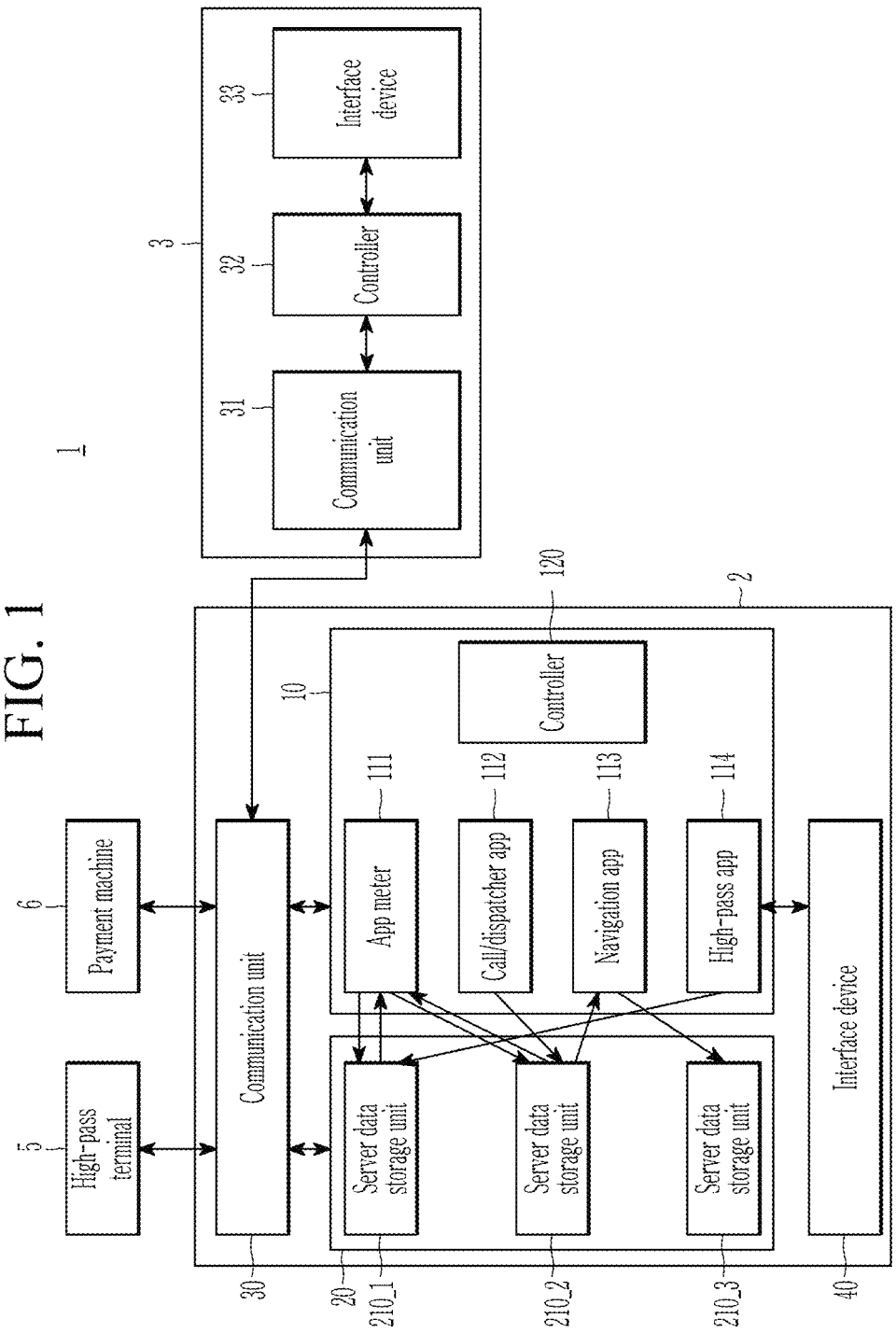
FIG. 1 is a view showing a taxi vehicle to which a taxi total terminal system according to an embodiment is applied.

Embodiments of the present invention relate to a taxi total terminal for a driver of a taxi vehicle and a user using a taxi vehicle. The driver's taxi total terminal includes a plurality of application programs necessary for providing a taxi service and a plurality of service data storage units for storing a service data required to operate a plurality of application programs. The user's taxi total terminal may provide information and content for the user in a situation where the user boards a taxi vehicle. For example, the user's taxi total terminal may guide taxi traveling and operation information, and the user may request a necessary service to the driver through the user's taxi total terminal. Through this, the user's experience while boarding the taxi is improved compared to the prior art, so that the satisfaction with the service provided by the taxi vehicle may be improved. Hereinafter, the driver's taxi total terminal is instructed as a first total terminal, and the user's taxi total terminal is instructed as a second total terminal.

Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to easily make a specification. Therefore, these terms do not have meanings or roles that distinguish them from each other in themselves. Further, in describing embodiments of the present specification, when it is determined that a detailed description of the well-known art associated with embodiments of the present invention may obscure the gist of embodiments of the present invention, it will be omitted. In addition, the accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not interpreted as limiting these components. The terms are only used to differentiate one component from other components.

In the specification, the word "comprise" or "has" is used to specify existence of a feature, a number, a process, an operation, a constituent element, a part, or a combination thereof, and it will be understood that existence or additional possibility of one or more other features or numbers, processes, operations, constituent elements, parts, or combinations thereof are not excluded.

FIG. 1 is a view showing a taxi vehicle to which a taxi total terminal system according to an embodiment is applied.

As shown in FIG. 1, a taxi vehicle 1 includes a taxi total terminal system consisting of a front-seat total terminal 2 positioned in a front seat for a driver and a rear-seat total terminal 3 positioned in a rear seat for an occupant. The taxi vehicle 1 may further include a high-pass terminal 5 and a payment machine 6 connected to the front-seat total terminal 2.

The front-seat total terminal 2 is positioned within a distance that the driver may operate in the taxi vehicle, and includes an application program device 10, a data management device 20, a communication unit 30, and an interface device 40.

The communication unit 30 transmits and receives the information between the front-seat total terminal 2 and an external device. For example, the information about the high-pass charge may be received from the high-pass terminal 5 and transmitted to the application program device 10. When the toll is processed through the high-pass terminal 5, the information about the high-pass fee from the high-pass terminal 5 may be transmitted to the high-pass app 114 by the communication unit 30. In addition, by the communication unit 30, after the taxi vehicle 1 arrives at the destination, the information on the total traveling charge may be transmitted to the payment machine 6. The billing day for the total service fee may be processed through the payment machine 6. The communication unit 30 may transmit the information processed from the front-seat total terminal 2 to the rear-seat total terminal 3, and may transmit the information input through the rear-seat total terminal 3 to the front-seat total terminal 2.

The interface device 40 may display various information on the screen of the front-seat total terminal 2 and transmit the information input by the driver to the application program device 10.

The application program device 10 may include a plurality of application programs 111 to 114 and a controller 120. A plurality of application programs 111 to 114 are application programs necessary for traveling with the taxi vehicle 1, are installed in the application program device 10, and may be executed by an operation of a driver. Alternatively, a specific application program among a plurality of application programs 111 to 114 may be executed by the control of the controller 120. Hereinafter, for convenience of explanation, the application program is abbreviated as "app". A plurality of apps 111-114 include an app meter 111, a call/dispatcher app 112, a navigation app 113, and a high-pass app 114. The app installed in the application program device 10 is not limited thereto, and an app for providing an audio/video service may be added. Each of a plurality of apps 111 to 114 may be executed based on the input from the driver and the data received from the data management device 20. The controller 120 may execute a specific app among a plurality of apps 111 to 114 in a situation where a predetermined condition is satisfied.

The data management device 20 includes a plurality of service data storage units 210_1 to 210_3.

The plurality of service data storage units 210_1 to 210_3 may store the data required to provide a plurality of services related to the operation of the taxi vehicle 1. For example, the service data storage unit 210_1 may store service data related to a payment of a traveling charge, the service data storage unit 210_2 may store service data related to a call/dispatch, and the service data storage unit 210_3 may store service data related to navigation. In addition, the specific service may further include a service related to air quality of the taxi vehicle, a service related to a taxi driver, a service related to a black box, a service related to a rear-seat camera, a service related to a rear-seat total terminal, and the like.

Each of the plurality of service data storage units 210_1 to 210_3 may be bound to a corresponding app among the plurality of apps 111 to 114. The app corresponding to each of the plurality of service data storage units 210_1 to 210_3 includes an app for writing data to the corresponding service data storage unit and an app for receiving written data from the corresponding service data storage unit. In this case, the number of the apps for receiving the written data from one of the plurality of service data storage units 210_1 to 210_3 may be two or more.

That is, each of the plurality of apps 111 to 114 may write the data to at least one service data storage unit connected for writing the data related to the app among the plurality of service data storage units 210_1 to 210_3. Each of the plurality of apps 111 to 114 may receive the written data from at least one service data storage unit connected for receiving the data related to the app among the plurality of service data storage units 210_1 to 210_3. Each of the plurality of service data storage units 210_1 to 210_3 may transmit the written data to the app connected to each of the plurality of service data storage units 210_1 to 210_3 in a broadcasting manner.

The rear-seat total terminal 3 may display information related to the taxi operation to the user (e.g., an occupant), receive a manipulation by the user as an input, and transmit the input to the front-seat total terminal 2.

The rear-seat total terminal 3 includes a communication unit 31, a controller 32, and an interface device 33.

The communication unit 31 transmits and receives the information between the rear-seat total terminal 3 and the front-seat total terminal 2. The information between the front-seat total terminal 2 and the rear-seat total terminal 3 may be transmitted/received through the wired/wireless communication between the communication unit 30 and the communication unit 31. The wired/wireless communication method is not limited to a specific method, and as a communication method applied between each configuration, one of various communication methods currently available may be applied.

The operation of the rear-seat total terminal 3 is performed according to the control by the controller 32. The instructions required for the operation control of the rear-seat total terminal 3 are implemented as a program, and the controller 32 may control the operation of the rear-seat total terminal 3 by executing the corresponding program.

The interface device 33 may display various information on the screen of the rear-seat total terminal 3 and transmit the information input by the user to the front-seat total terminal 2.

Hereinafter, the operation of the taxi total terminal system according to an embodiment is described with reference to FIG. 2 to FIG. 8.

Figure 2:
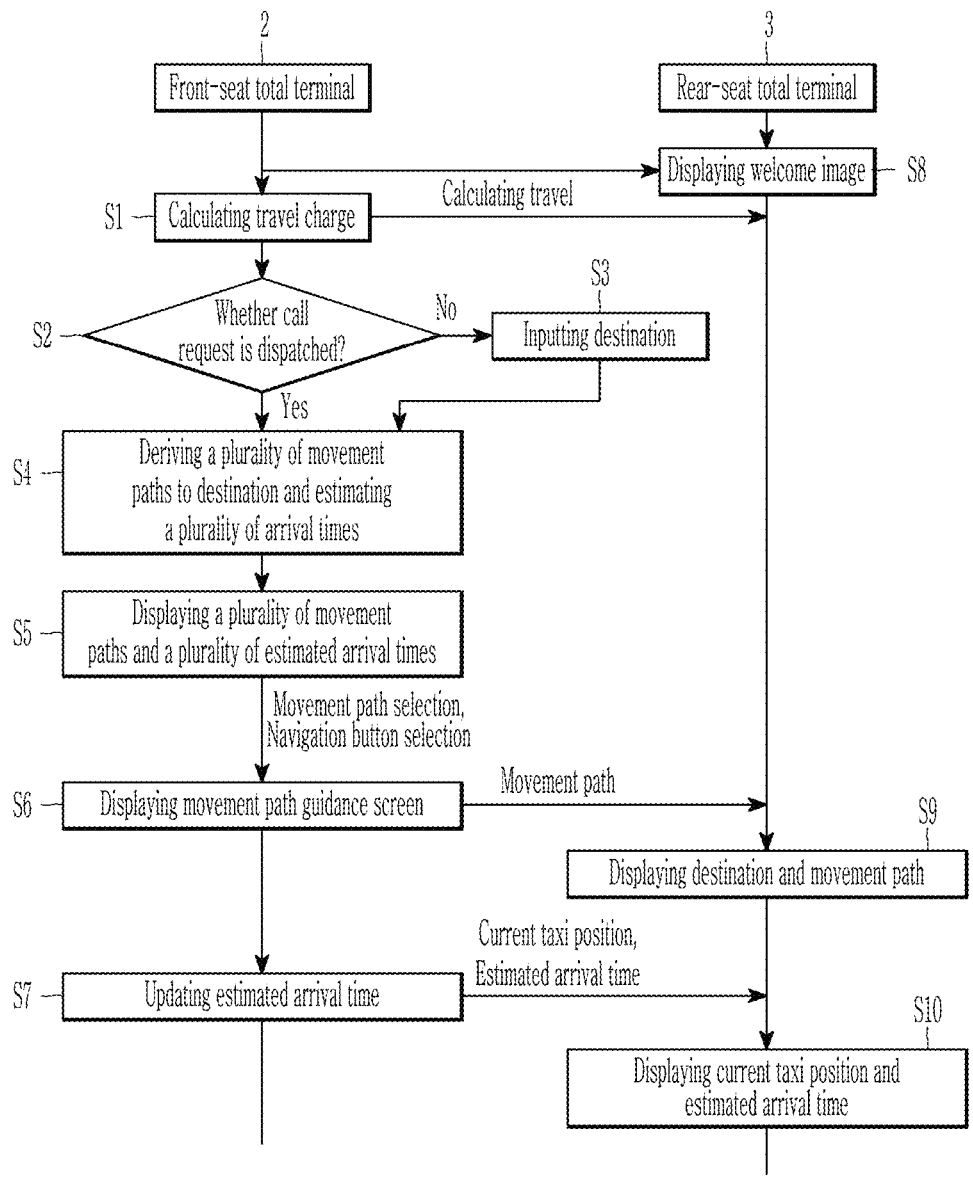
FIG. 2 is a flowchart showing an operation of a taxi total terminal system after boarding an occupant according to an embodiment.

FIG. 2 is a flowchart showing an operation of a taxi total terminal system after boarding an occupant according to an embodiment.

When the user boards the dispatched taxi vehicle, the driver starts the traveling.

The app meter 111 may display necessary buttons according to the operating conditions of the taxi vehicle 1 among the 'Drive', 'Empty car', 'Pay', 'Intercity', 'City,' and 'Surcharge' buttons on the screen of the front-seat total terminal 2. The driver selects the 'Drive' button on the screen of the front-seat total terminal 2 along with the start of the traveling. When the app meter 111 detects the 'Drive' button selection, it measures the moving distance of the taxi vehicle 1 from the time when the drive button is selected, calculates the traveling charge according to the measured distance, and displays it on the screen of the front-seat total terminal 2 and may transmit it to the rear-seat total terminal 3 (S1). The app meter 111 may detect the 'Traveling' button selection and write a business status of the taxi vehicle of the service data storage unit 210_2 as traveling.

Figure 3:
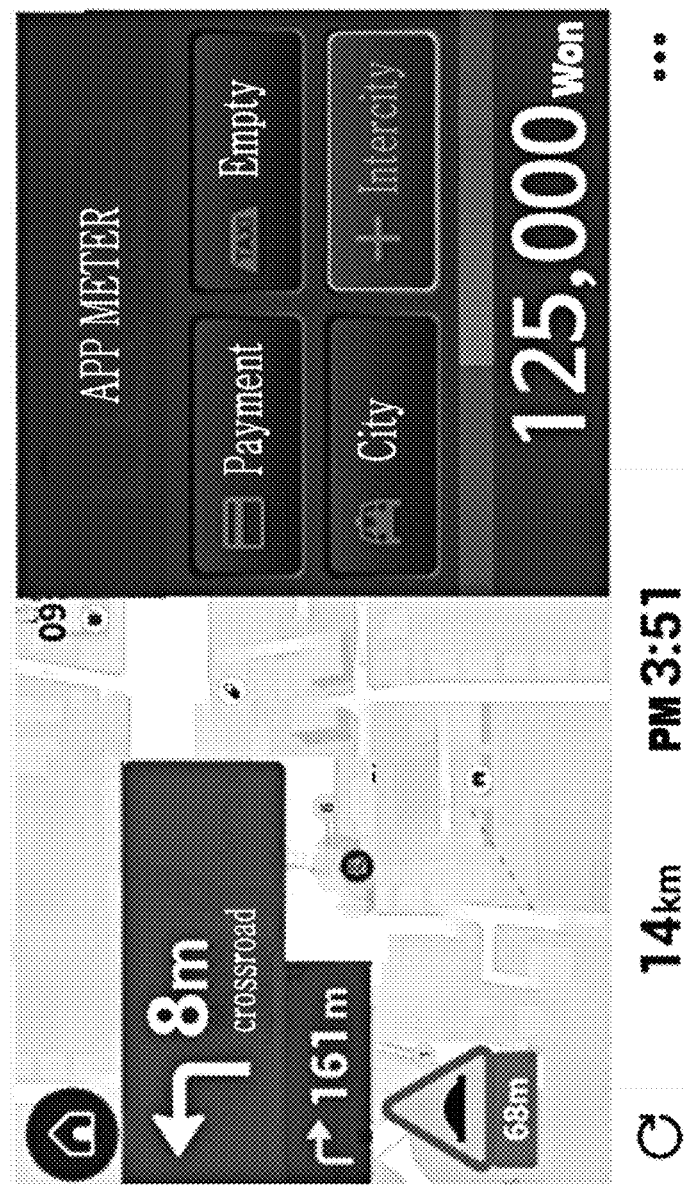
FIG. 3 is a view showing some screens displayed on a front-seat total terminal while traveling.

FIG. 3 is a view showing some screens displayed on a front-seat total terminal while traveling.

FIG. 3 shows an example in which the screen provided by the app meter 111 and the screen provided by the navigation app 113 are displayed together.

As shown in FIG. 3, during the traveling of the taxi vehicle 1, the 'Pay' button, which is selected when paying the total service fee, the 'City' button and the 'Intercity' button indicating the traveling area, and the 'Empty' button may be displayed. In addition, the current traveling charge may also be displayed. When the 'City' button is selected, the app meter 111 may calculate a service fee based on a city reference fee, and when the 'Intercity' button is selected, the app meter 111 may calculate a service fee based on an intercity reference fee. Although not shown in FIG. 3, when the 'surcharge' button is selected, the app meter 111 may calculate the operation fee based on a surcharge reference fee.

The controller 120 determines whether the taxi vehicle is dispatched according to the user's call request (S2). The call/dispatcher app 112 may receive the information about the call request (a departure point, a destination, etc.) from a server that manages the call/dispatcher, and may write it to the service data storage unit 210_2. The controller 120 may obtain the information about the call request from the service data storage unit 210_2 and determine whether the taxi vehicle is dispatched according to the call request.

The call/dispatcher app 112 may write the information about the call dispatch to the service data storage unit 210_2. The information on the call dispatch may include a departure point, a destination, a dispatched taxi vehicle number, information about a driver, and the like.

As the determination result of S2, if the taxi vehicle is not dispatched according to the user's call request, the controller 120 may transmit that the taxi vehicle is not dispatched according to the call request to the navigation app 113. The navigation app 113 is executed by the operation of the controller 120 or the driver, so that the driver may input the destination, and the destination input window may be displayed on the screen of the front-seat total terminal 2. The navigation app 113 may receive the destination input from the driver (S3).

As the determination result of S2, if the taxi vehicle if dispatched according to the user's call request, the controller 120 may execute the navigation app 113. Alternatively, the navigation app 113 may be activated by the manipulation of the driver.

The service data storage unit 2102 may deliver the destination information among the written call dispatch information to the navigation app 113. The navigation app 113 receives the information about the destination from the service data storage unit 2102, derives a plurality of movement paths from the current position of the taxi vehicle 1 to the destination, and estimates the arrival time for each of the derived plurality of movement paths may be determined (S4).

The navigation app 113 displays the plurality of derived movement paths and the plurality of estimated arrival times on the screen of the front-seat total terminal 2 (S5). The driver may select one of a plurality of movement paths on the screen of the front-seat total terminal 2 and select a navigation button provided by the navigation app 113.

When the navigation app 113 detects the navigation button selection, a guidance screen showing the movement path selected by the driver is displayed on the screen of the front-seat total terminal 2 (S6). In addition, the navigation app 113 periodically updates the estimated arrival time by reflecting the real-time traffic status, and displays the estimated arrival time on the screen of the front-seat total terminal 2 (S7). The navigation app 113 may transmit the information about the selected movement path, the current taxi position on the selected movement path, and the updated estimated arrival time to the rear-seat total terminal 3.

The app meter 111 calculates the travel fee according to the distance traveled by the taxi vehicle, displays it on the screen of the front-seat total terminal 2, and transmits it to the rear-seat total terminal 3. That is, the app meter 111 continuously performs the step S1.

The rear-seat total terminal 3 may receive the business status 'Traveling' from the service data storage unit 210_2 and display a welcome image on the screen (S8). The rear-seat total terminal 3 displays the destination and the movement path received from the navigation app 113 (S9).

The rear-seat total terminal 3 may receive the current taxi position and the estimated arrival time, and may display the current taxi position and the estimated arrival time on the movement path displayed on the screen of the rear-seat total terminal 3 (S10).

Figure 4:
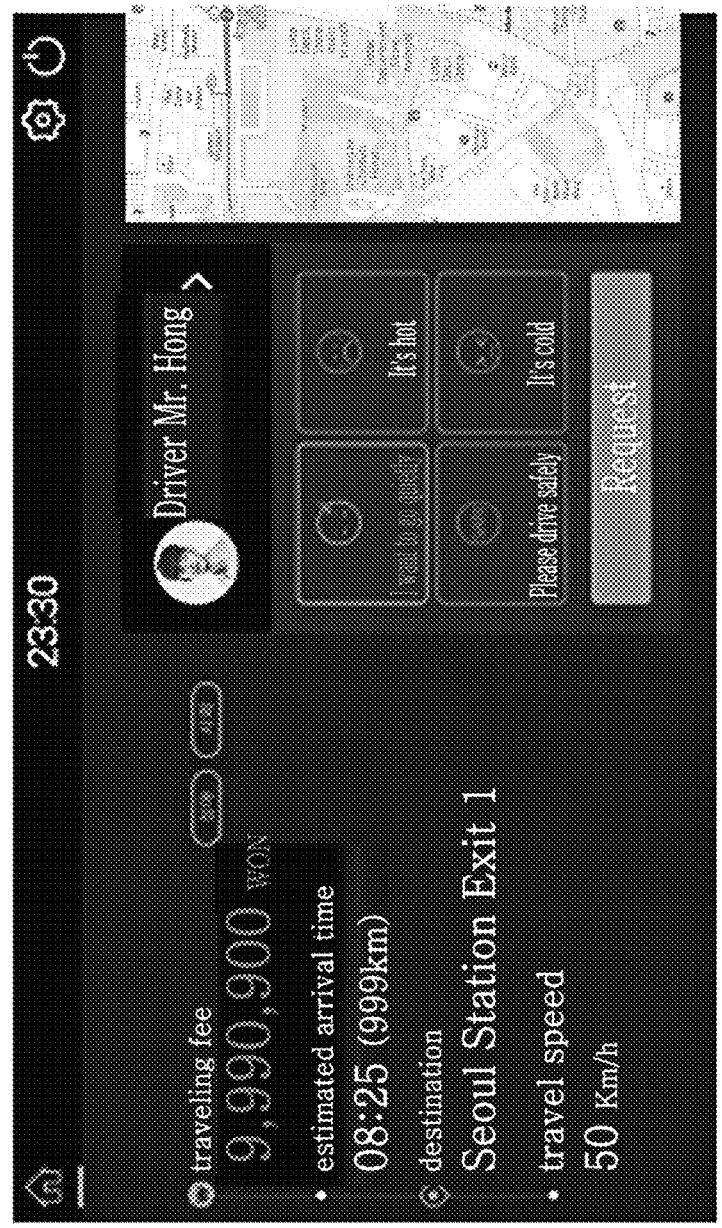
FIG. 4 is a view showing a screen of a rear-seat total terminal during an operation according to an embodiment.

FIG. 4 is a view showing a screen of a rear-seat total terminal during an operation according to an embodiment.

As shown in FIG. 4, the rear-seat total terminal 3 may display a map with the traveling fee, the estimated arrival time, the destination, the travel speed, and the movement path. In addition, the rear-seat total terminal 3 may receive and display the driver information from the front-seat total terminal 2.

Also, as shown in FIG. 4, "I want to go quietly", "It's hot", "Please drive safely", and "It's cold" buttons are provided in the center screen of the rear-seat total terminal 3. The user may select one of the above buttons as needed, and the interface device 33 recognizes this and transmits the information about the selected button to the controller 32. The controller 32 may transmit the information selected by the user to the front-seat total terminal 2 through the communication unit 31. The front-seat total terminal 2 may display the user's request selected through rear-seat total terminal 3 on the screen.

Figure 5:
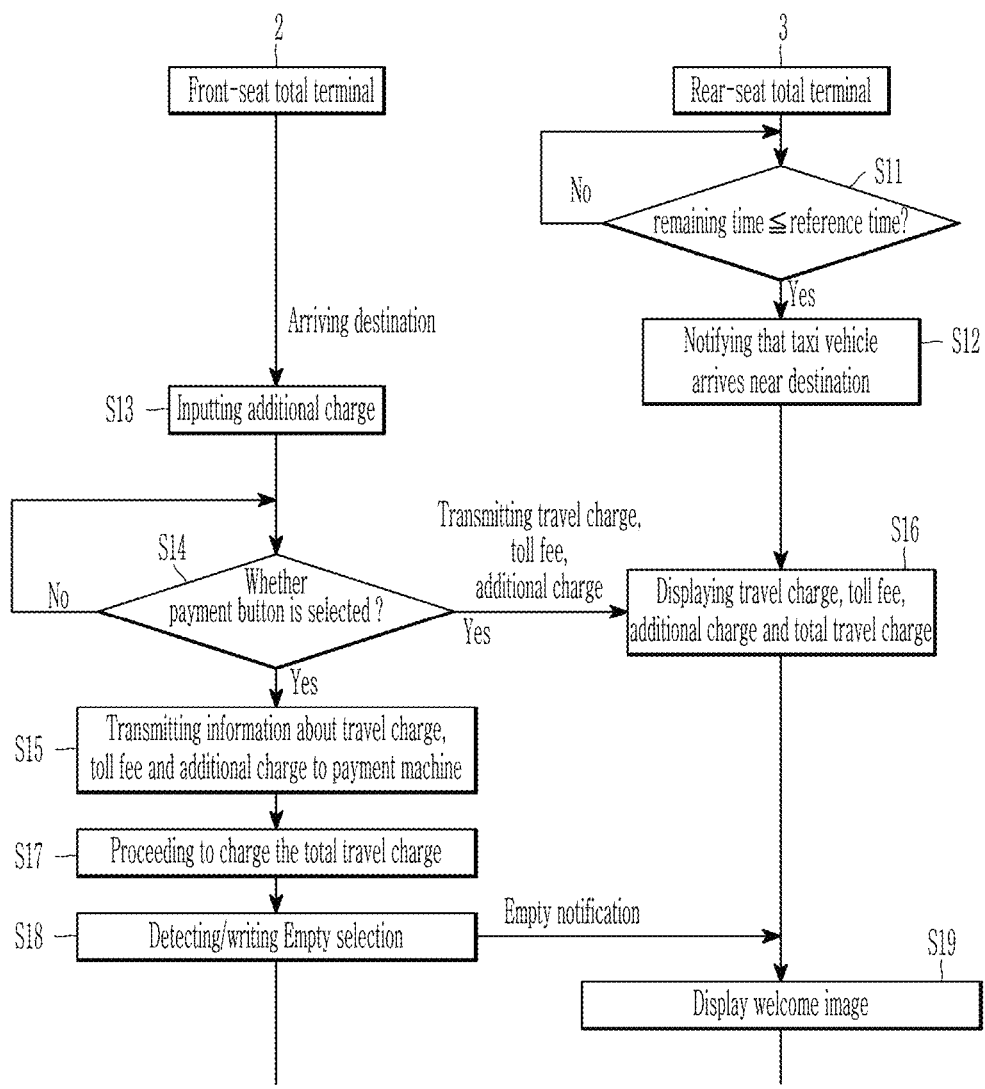
FIG. 5 is a flowchart showing an operation when a taxi total terminal system according to an embodiment is adjacent to a destination.

FIG. 5 is a flowchart showing an operation when a taxi total terminal system according to an embodiment is adjacent to a destination.

The rear-seat total terminal 3 calculates the remaining time required to arrive at the destination based on the expected arrival time and the current time, and determines whether the calculated remaining time is less than or equal to a predetermined reference time (e.g., 5 minutes) (S11).

As the judgment result of the step S11, if the expected remaining time is less than the reference time, the rear-seat total terminal 3 informs that the taxi has arrived near the destination (S12). For example, the rear-seat total terminal 3 may open a pop-up window indicating that it is near the destination for a predetermined period and then close it. Alternatively, the pop-up window may be closed by the user's manipulation.

When the taxi vehicle 1 arrives at the destination, the driver may input the information about the additional charge that is required to the input field displayed on the screen of the front-seat total terminal 2. The app meter 111 displays the additional charge input field on the screen of the front-seat total terminal 2, and may receive the additional charge input from the driver (S13). The app meter 111 may write the additional charge to the service data storage unit 210_1. The service data storage unit 210_1 includes a travel charge field, a toll fee field, and an additional charge field. The travel fee information written by the app meter 111 may be stored in the travel charge field, the high-pass fee information written by the high-pass app 114 may be stored in the toll fee field, and the additional charge information input by the driver through the app meter 111 may be stored in the additional charge field. The app meter 111 may transmit the information on the travel charge, the toll fee, and the additional charge to the rear-seat total terminal 3.

The app meter 111 monitors whether the user selects the payment button through the rear-seat total terminal 3 (S14).

As the monitoring result of the step S14, if the 'payment' button selection is detected, the app meter 111 writes that the payment is selected on the service data storage unit 210_1. The service data storage unit 210_1 may transmit the information on the travel fee, the toll fee, and the additional charge to the payment machine 6 and the rear-seat total terminal 3 (S15).

The rear-seat total terminal 3 receives the information on the travel charge, the toll fee, and the additional charge, and displays the travel charge, the toll fee, and the additional charge, and a total travel charge (the travel charge+the toll fee+the additional charge) may be displayed (S16).

The payment machine 6 proceeds to charge the total travel charge using a payment method (S17). The payment method may be a credit card, an electronic payment method, or the like of the user.

The driver may select the 'Empty' button on the screen of the front-seat total terminal 2 after completing the payment. When the 'Empty' button selection is detected, the app meter 111 writes the business status as Empty on the service data storage unit 210_2 that stores the service related to the call dispatch (S18). When the business status 'Empty' is written in the service data storage unit 210_2, the corresponding information is broadcasted to the call/dispatcher app 112, and the call/dispatcher app 112 may be switched from the travel mode to the call standby state. The traveling mode indicates the operation state of the front-seat total terminal 2 when the taxi vehicle 1 is traveling, and the call/dispatcher app 112 may not respond to the call request in the call standby state.

In addition, the rear-seat total terminal 3 receives the business status 'Empty' from the service data storage unit 210_2, and displays the non-boarding status screen. The non-boarding status screen is a predetermined screen, and may be a screen in which menu icons indicating functions of the rear-seat total terminal 3 are listed.

The rear-seat total terminal 3 may receive the empty notification and display a welcome image on the screen (S19).

Figure 6:
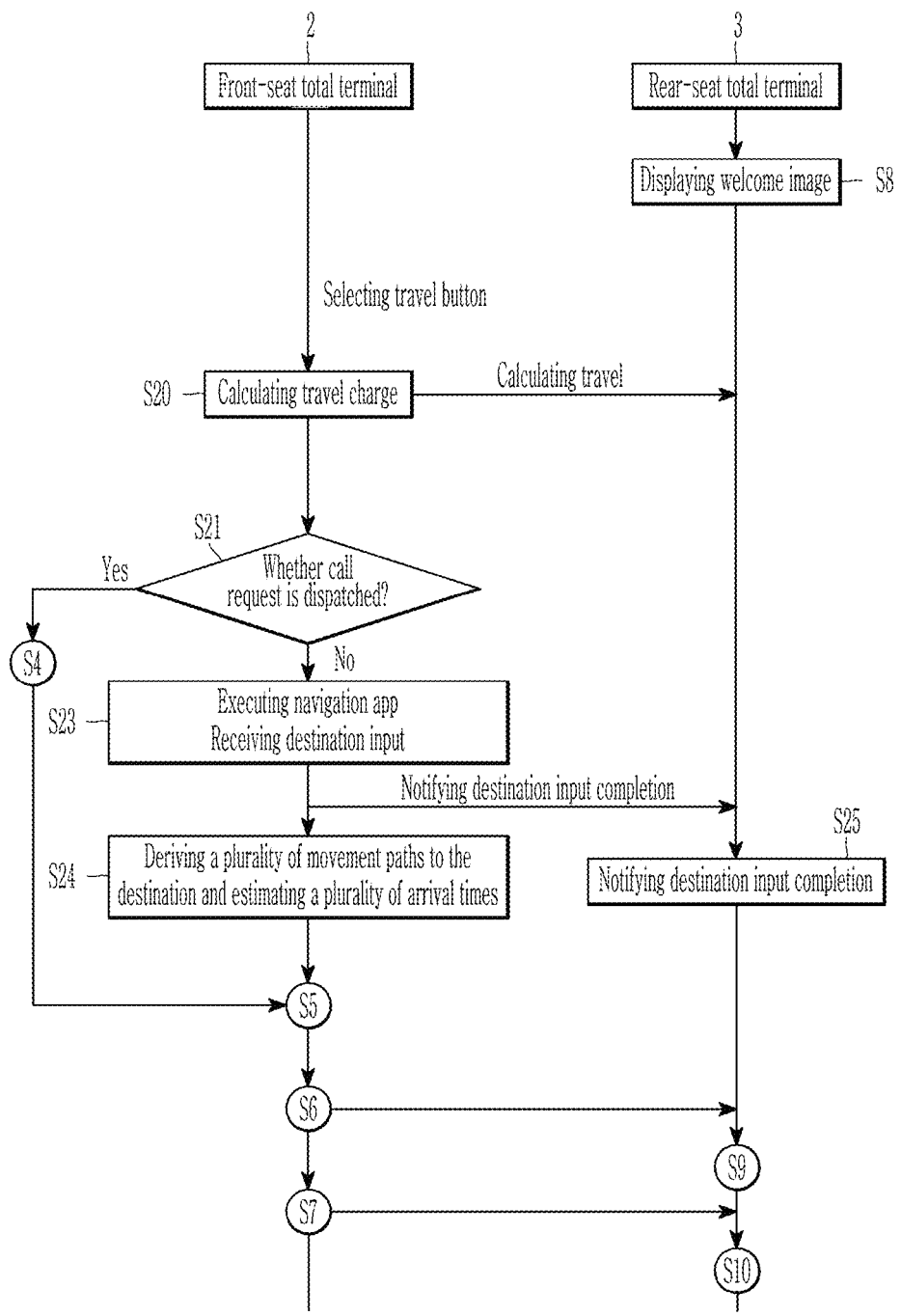
FIG. 6 is a flowchart showing an operation of a taxi total terminal system according to an embodiment after boarding an occupant.

FIG. 6 is a flowchart showing an operation of a taxi total terminal system according to an embodiment after boarding an occupant.

The embodiment described with reference to FIG. 6 is an embodiment for a case in which the occupant is boarded in a taxi vehicle that is roaming, not the taxi vehicle dispatched in response to the call of the occupant. The detailed description of the contents overlapping with the embodiment of FIG. 2 is omitted.

The user boards the random taxi vehicle that is in the business of roaming. After the user boards, the driver selects the 'Traveling' button on the screen of the front-seat total terminal 2 along with the start of the traveling. When the 'Traveling' button is detected, the app meter 111 measures the movement distance of the taxi vehicle from the time of the traveling, calculates the traveling charge according to the measured distance, displays it on the screen of the front-seat total terminal 2, and may transmit it to the rear-seat total terminal 3 (S20).

The controller 120 determines whether the taxi vehicle is dispatched according to the user's call request (S21). Since the controller 120 cannot obtain the information about the call request from the call/dispatcher app 112, it is determined that the taxi vehicle is not dispatched according to the user's call request. The controller 120 may transmit to the navigation app 113 that the taxi vehicle is not dispatched according to the call request. For reference, in the case of the taxi vehicle dispatched according to the call request, the step S4 to the step S10 are followed.

The navigation app 113 may be executed by the operation of the controller 120 or the driver to display the destination input window on the screen of the front-seat total terminal 2, so that the driver may input the destination. The navigation app 113 may receive the destination input from the driver (S23).

When receiving the destination input from the driver, the navigation app 113 may write the information about the destination in the service data storage unit 210_3. The navigation app 113 may derive a plurality of movement paths from the current position to the destination, and estimate the arrival time for each of the derived plurality of movement paths (S24).

The navigation app 113 notifies the destination input to the rear-seat total terminal 3, and the rear-seat total terminal 3 may notify the completion of the destination input by displaying it on the screen (S25).

The operation of the front-seat total terminal 2 after the step S24 and the operation of the rear-seat total terminal 3 after the step S25 are the same as the step S5 to the step S10 in FIG. 2 described above. Furthermore, when close to the destination, the step S11 to the step 19 of FIG. 5 are performed.

If the driver of the roaming taxi vehicle hears the destination from the user and knows the path from the current position to the destination, the taxi vehicle may be operated without using the navigation app 113. In this case, the navigation app 113 may display only the current position on the screen of the front-seat total terminal 2 and the rear-seat total terminal 3.

Figure 7:
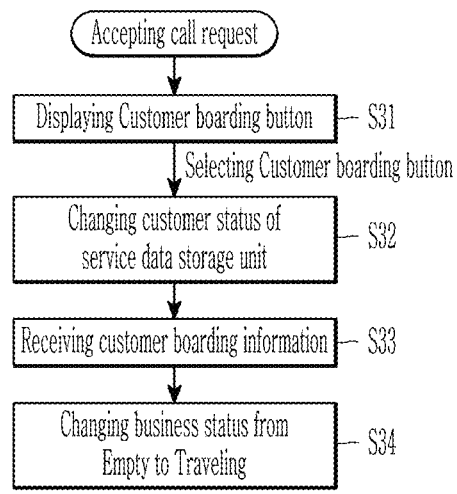
FIG. 7 is a flowchart showing an operation of an app meter when boarding a call dispatch occupant according to an embodiment.

FIG. 7 is a flowchart showing an operation of an app meter when boarding a call dispatch occupant according to an embodiment.

If the driver accepts the call request from the occupant through the call/dispatcher app 112, the call/dispatcher app 112 may display the "Customer boarding" button on the screen of the front-seat total terminal 2 (S31). When the call request occupant boards the taxi vehicle, the "Customer boarding" button can be selected on the screen of the front-seat total terminal 2 along with the traveling start by the driver.

The call/dispatcher app 112 detects the "Customer boarding" button selection and changes the customer status of the service data storage unit 210_2 (S32). For example, the call/dispatcher app 112 may write the data indicating whether the customer is boarding in the customer status field of the service data storage unit 210_2.

The app meter 111 is connected to the service data storage unit 210_2 and receives the customer boarding information broadcast from the service data storage unit 2102 (S33).

The app meter 111 may receive the customer boarding information and automatically change the business status of the taxi vehicle from Empty to Traveling (S34).

The operation after the step S35 may be the same as an embodiment with reference to FIG. 2 and FIG. 5.

Figure 8:
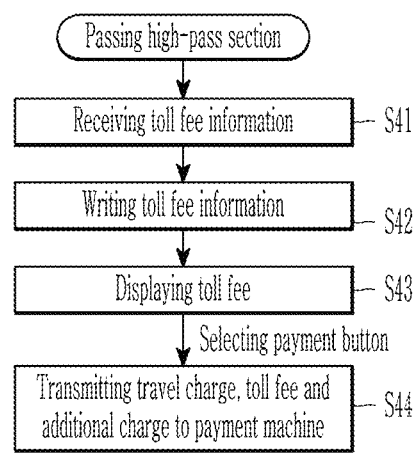
FIG. 8 is a view showing an operation when a taxi vehicle according to an embodiment passes through a high-pass section.

FIG. 8 is a view showing an operation when a taxi vehicle according to an embodiment passes through a high-pass section.

First, when the taxi vehicle passes the high-pass section, the amount paid by the high-pass terminal 5 provided in the taxi vehicle is transmitted to the front-seat total terminal 2. For example, the high-pass terminal 5 and the communication unit 30 of front-seat total terminal 2 are connected via the wired/wireless communication, so the high-pass charge information may be transmitted from the high-pass terminal 5 to the high-pass app 114. The high-pass app 114 receives the high-pass charge information (S41).

The high-pass app 114 writes the information about the high-pass fee in the toll fee field of the service data storage unit 210_1 (S42).

The app meter 111 connected to the service data storage unit 210_1 may receive the high-pass charge information broadcasted from the service data storage unit 210_1 and display it on the screen of the front-seat total terminal 2 (S43). For example, on the screen of the front-seat total terminal 2 shown in FIG. 3, the high-pass fee may be displayed in a specific area.

After the taxi vehicle arrives at the destination, when the "Pay" button is selected by the driver, the travel charge, toll fee, and additional charge information stored in the service data storage unit 210_1 is transmitted to the payment machine 6 (S44).

Subsequently, the operation of the steps S16 to S19 of the embodiment described with reference to FIG. 5 may be performed.

The front-seat total terminal 2 according to an embodiment may receive the input information through the various input buttons provided in the taxi vehicle, and the app corresponding to the received input information among a plurality of apps provided in the front-seat total terminal 2 may process the received input information.

For example, the steering wheel of the taxi vehicle is equipped with a call approval button and a call rejection button. The front-seat total terminal 2 may acquire the driver's intention to accept or reject the call request through the call approval button and call rejection button. In order to acquire the information (hereinafter referred to as call request selection information) about the acceptance or the rejection of the call request by using the call approval button and the call rejection button, the front-seat total terminal 2 may be connected to the taxi vehicle 1 through the Bluetooth™ communication. Then, the information on which any button among the call approval button and call rejection button is selected from the electronic control apparatus provided in the taxi vehicle 1 may be transmitted to the front-seat total terminal 2 through the Bluetooth communication.

Figure 9:
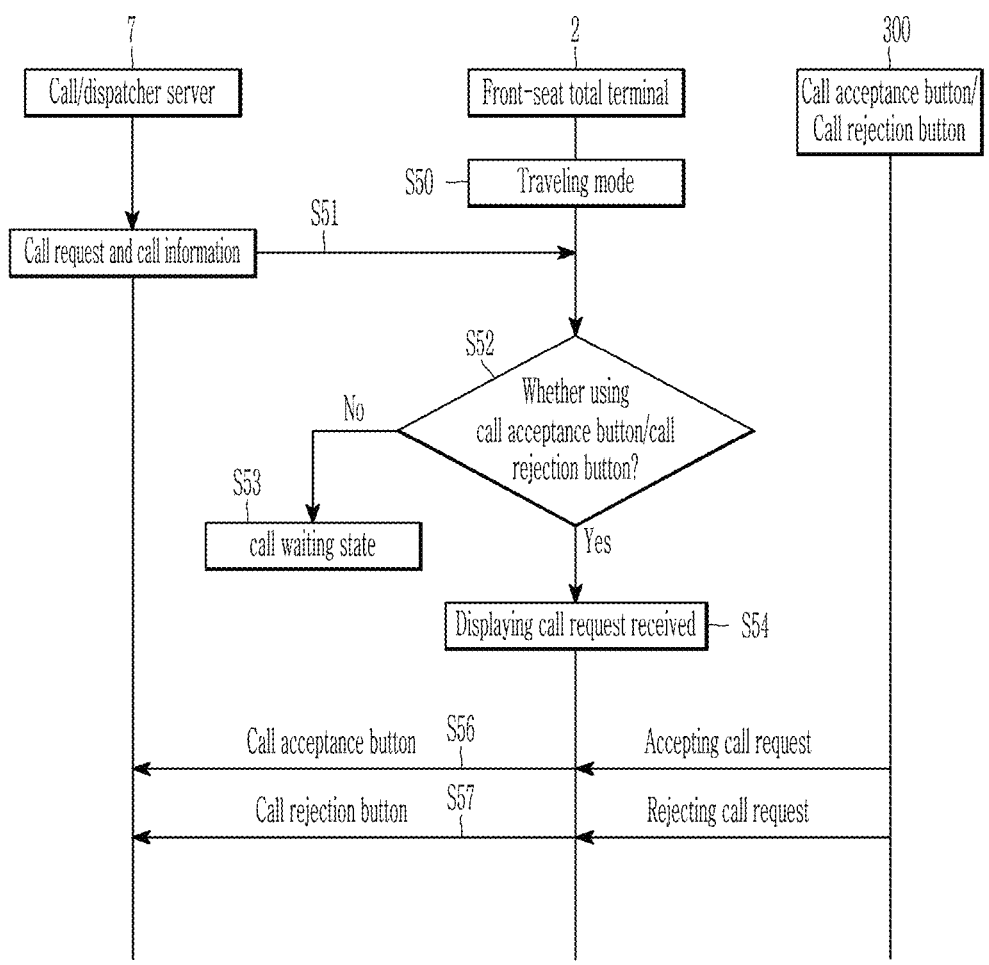
FIG. 9 is a flowchart illustrating a step in which a call request acceptance or rejection is performed using a call approval button or a call rejection button in a terminal according to an embodiment.

FIG. 9 is a flowchart illustrating a step in which a call request acceptance or rejection is performed using a call approval button or a call rejection button in a terminal according to an embodiment.

In FIG. 9, a call approval button/call rejection button 300 may be positioned on the steering wheel of the taxi vehicle 1.

The taxi vehicle 1 starts the traveling, the taxi vehicle 1 is currently traveling, and the front-seat total terminal 2 operates in the traveling mode (S50). In the traveling mode, the app required for the traveling of the taxi vehicle 1 may be executed in the front-seat total terminal 2. Since the call/dispatcher app 112 is not related to the current traveling, the front-seat total terminal 2 in the traveling mode may execute the call waiting operation to receive the call request.

The front-seat total terminal 2 may receive a call request and call information from a call/dispatcher server 7 (S51). The call/dispatcher server 7 receives the call request from the user terminal of the occupant, transmits the call request and the call information to the vehicle terminal provided in a plurality of taxi vehicles, approves the call request from the vehicle terminal of the driver who has accepted the call request, and dispatches the corresponding taxi vehicle to the user. The call information may include information such as the departure point and the destination. Additionally, the call/dispatcher server 7 may transmit/receive various information necessary to provide the call/dispatcher service to a taxi vehicle terminal and a user terminal. The taxi vehicle terminal according to an embodiment may be the front-seat total terminal 2.

The front-seat total terminal 2 determines whether the call request selection information may be obtained using the call acceptance button/call rejection button 300 (S52). For example, if the front-seat total terminal 2 is not connected to the taxi vehicle 1 through the Bluetooth communication, the information about the call request approval or the rejection using the call acceptance button/call rejection button 300 may not be obtained. For other reasons, the front-seat total terminal 2 may not be able to acquire the call request selection information through the call acceptance button/call rejection button 300.

As the determining result of the step S52, if the call request selection information cannot be obtained through the call acceptance button/call rejection button 300, the front-seat total terminal 2 is in the call waiting state to receive the call request as the traveling mode is maintained (S53).

As the determining result of the step S52, if the call request selection information can be obtained through the call acceptance button/call rejection button 300, the front-seat total terminal 2 may display "Call request received" on the screen, and may display the departure point and the destination based on the call information together (S54). The front-seat total terminal 2 may display together to select the acceptance and the rejection of the call request using the call acceptance button/call rejection button 300.

The front-seat total terminal 2 receives the information about the selected button among the call acceptance button/call rejection button 300.

When the call acceptance button is selected, the front-seat total terminal 2 transmits the call request acceptance to the call/dispatcher server 7 (S56). Subsequently, the call/dispatcher app 112 may write the call information for the accepted call request to the service data storage unit 210_2.

When the call rejection button is selected, the front-seat total terminal 2 transmits the call request rejection to the call/dispatcher server 7 (S57).

In the step S54, the front-seat total terminal 2 may display the screen suitable for the traveling mode after the call request reception, the departure point, and the destination are displayed on the screen for a predetermined time. Alternatively, until any one of the call approval button/call rejection button 300 is selected, the step S54 may be performed. If the taxi vehicle 1 is before the arrival at the destination, after any one of the call approval button/call rejection button 300 is selected, the front-seat total terminal 2 may display the screen suitable for the traveling mode.

While the front-seat total terminal 2 displays the call request reception, the departure point, and the destination on the screen, in order to approve or reject the call using the call acceptance button/call rejection button 300, the driver may press the corresponding button for more than a predetermined time to accept or reject the call.

What is described in the present disclosure does not limit the application of the non-disclosed technology to the present invention. That is, it is possible to provide a new service by combining the currently known technologies and the present invention, and the content described in the present disclosure does not limit it.

The front-seat total terminal is a terminal dedicated to taxi operators, and a plurality of channels required to provide the taxi service through the front-seat total terminal may be integrated into one channel. Through this, the driver may experience a taxi service providing environment that is easier to operate than a conventional one before and after the taxi operation.

Until now, the taxi services have focused on convenience before/after boarding. There is insufficient taxi service to improve the experience during the boarding. The experience while boarding is formed only by the actions and responses of the taxi driver, and communication between the taxi user and the taxi driver is not smooth. Embodiments of the present invention may provide more smooth communication between the taxi user and the taxi driver through the rear-seat total terminal provided in the rear seat.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A total terminal system comprising:
   a front-seat total terminal provided in a front driver compartment of a taxi vehicle and configured for use by a driver of the taxi vehicle, wherein the front-seat total terminal comprises:
      an application program device configured to execute a plurality of application programs provided for operation of the taxi vehicle; and
      a data management device comprising a plurality of service data storage units configured to store data for providing a plurality of services related to the operation of the taxi vehicle; and
   a rear-seat total terminal provided in a rear passenger compartment of the taxi vehicle and configured for use by a passenger of the taxi vehicle,
   wherein each of the plurality of service data storage units is bound to a corresponding application program among the plurality of application programs,
   wherein a first application program among the plurality of application programs is configured to write first information to a corresponding first service data storage unit among the plurality of service data storage units, and
   wherein the first service data storage unit is configured to transmit the first information to a second application program among the plurality of application programs, the second application program being connected to the first service data storage unit in a broadcasting manner,
   wherein the second application program is configured to receive information about a call request from a call/dispatcher server that manages a call/dispatcher and write information about the received information to a second service data storage unit among the plurality of service data storage units, the second service data storage unit being configured to store service data related to the call/dispatcher, wherein the first application program is configured to write a business status of the taxi vehicle to the second service data storage unit, and the business status includes a traveling status or an empty status,
   wherein, in response to the first application program writing the business status as the empty status to the second service data storage unit, the second service data storage unit is configured to transmit information indicating an empty car to the second application program, and the second application program is configured to switch to a call waiting state, wherein the first service data storage unit includes a travel charge field, a toll fee field, and an additional charge field,
   wherein the first application program is configured to:
      calculate a travel charge by measuring a moving distance of the taxi vehicle in response to selection of a travel button;
      write the travel charge to the travel charge field of the first service data storage unit; and
      receive an additional charge by the driver and write the additional charge to the additional charge field of the first service data storage unit, and
   wherein a third application program is configured to receive a high-pass fee from a high-pass terminal and write information about the high-pass fee in the toll fee field of the first service data storage unit.

2. The total terminal system of claim 1, wherein:
   each of the front-seat total terminal and the rear-seat total terminal is configured to display the travel charge on a respective screen.

3. The total terminal system of claim 2, wherein the first application program is configured to receive city, intercity, and surcharge information and calculate the travel charge based on the information.

4. The total terminal system of claim 1, wherein:
   in response to a payment selection input, the first application program is configured to write a payment to the first service data storage unit; and
   the first service data storage unit is configured to transmit information on a travel charge, information on the high-pass fee, and information on the additional charge to a payment machine and to the rear-seat total terminal.

5. The total terminal system of claim 1, wherein a fourth application program among the plurality of application programs is configured to:
   receive information about a destination from the second service data storage unit;
   derive a plurality of movement paths from a current position of the taxi vehicle to the destination;
   estimate an arrival time for each of the plurality of derived movement paths; and transmit the destination, a selected one of the plurality of derived movement paths, and the estimated arrival time based on the selected movement path to the rear-seat total terminal.

6. The total terminal system of claim 1, wherein a fourth application program among the plurality of application programs is configured to:
  derive a plurality of movement paths based on a destination of the passenger;
  estimate an arrival time for each of the plurality of derived movement paths; and
  transmit the destination, a selected movement path among the plurality of derived movement paths, and the estimated arrival time for the selected movement path to the rear-seat total terminal.

7. The total terminal system of claim 6, wherein the rear-seat total terminal is configured to calculate a remaining time required for the taxi vehicle to arrive at the destination along the selected movement path and indicate that the taxi vehicle is near the destination in response to the remaining time being less than or equal to a predetermined reference time.

8. The total terminal system of claim 1, wherein, in response to receiving the call request from the call/dispatcher server managing the call/dispatcher, the front-seat total terminal is configured to:
  receive information on which button among a call approval button or a call rejection button of a steering wheel of the taxi vehicle is selected from the taxi vehicle through a Bluetooth communication; and
  accept or reject the call request in response to the information.

9. A method of operating a total terminal system comprising a front-seat total terminal provided in a front driver compartment of a taxi vehicle for use by a driver of the taxi vehicle and a rear-seat total terminal provided in a rear passenger compartment of the taxi vehicle for use by a passenger of the taxi vehicle, the method comprising:
  binding each of a plurality of service data storage units to a corresponding application program among a plurality of application programs;
  writing first information to a corresponding first service data storage unit among the plurality of service data storage units of the front-seat total terminal by a first application program among the plurality of application programs of the front-seat total terminal;
  transmitting the first information to a second application program among the plurality of application programs, the second application program being connected to the first service data storage unit in a broadcasting manner;
  receiving information about a call request from a call/dispatcher server that manages a call/dispatcher through the second application program;
  writing the received information about the call request in a second service data storage unit among the plurality of service data storage units that stores service data related to call/distribution;
  transmitting, by the second service data storage unit, information indicating an empty car to the second application program in response to the first application program writing a business status as an empty status to the second service data storage unit; and
  switching, by the second application program, to a call waiting state;
  wherein the first service data storage unit includes a travel charge field, a toll fee field, and an additional charge field,
  the method further comprising:
    calculating, by the first application program, a travel charge by measuring a moving distance of the taxi vehicle in response to selection of a travel button and writing the travel charge to the travel charge field of the first service data storage unit;
    receiving, by the first application program, an additional charge by the driver and writing the additional charge to the additional charge field of the first service data storage unit; and
    receiving, by a third application program, a high-pass fee from a high-pass terminal and writing information about the high-pass fee in the toll fee field of the first service data storage unit.

10. The method of claim 9, further comprising:
displaying the travel charge by each of the front-seat total terminal and the rear-seat total terminal.

11. The method of claim 9, further comprising:
receiving, by the front seat total terminal, information on which any button among a call approval button or a call rejection button is selected from the taxi vehicle through a Bluetooth communication in response to receiving the call request from the call/dispatcher server managing the call/dispatcher; and
accepting or rejecting the call request in response to the information.

12. The method of claim 11, further comprising:
receiving information about a destination from the second service data storage unit through a fourth application program among the plurality of application programs;
deriving a plurality of movement paths from a current position of the taxi vehicle to the destination;
estimating an arrival time for each of the plurality of derived movement paths; and
transmitting the destination, a selected movement path among the derived plurality of movement paths, and the estimated arrival time for the selected movement path to the rear-seat total terminal.

* * * * *

UNITED STATES PATENT AND TRADEMARK OFFICE
CERTIFICATE OF CORRECTION

| | |
|---|---|
| PATENT NO. | : 12,322,213 B2 |
| APPLICATION NO. | : 17/697453 |
| DATED | : June 3, 2025 |
| INVENTOR(S) | : Oh et al. |

Page 1 of 1

It is certified that error appears in the above-identified patent and that said Letters Patent is hereby corrected as shown below:

In the Claims

In Column 14, in Claim 1, Lines 14-18, after "call/dispatcher," delete "wherein the first .............................. status or an empty status," and insert the same from Line 15 as a new paragraph/point.

Signed and Sealed this
Fifteenth Day of July, 2025

Coke Morgan Stewart
*Acting Director of the United States Patent and Trademark Office*